Jan. 3, 1950     A. W. DASCHKE     2,493,060
ELECTRICAL CONTROL DEVICE
Filed Dec. 31, 1946
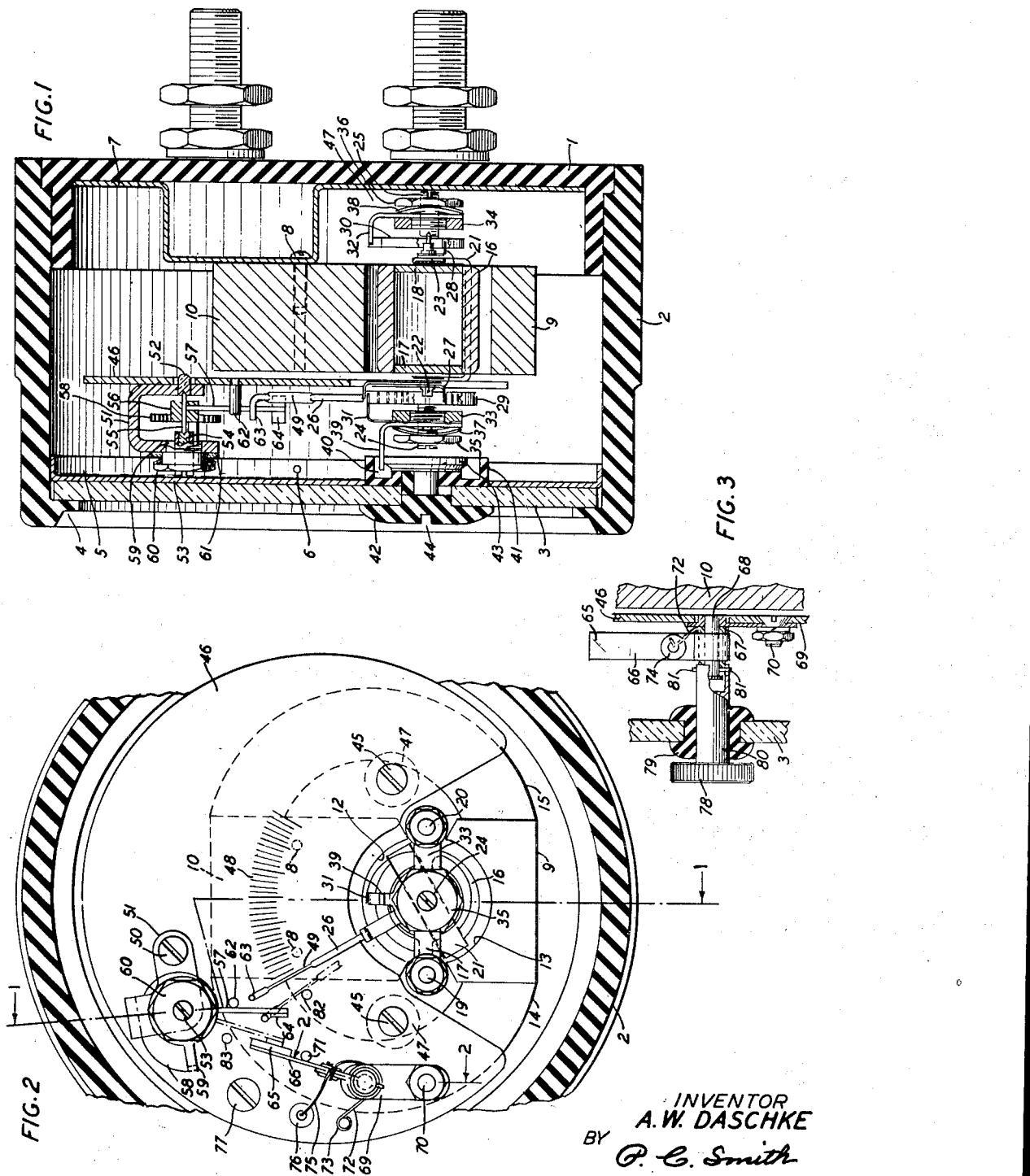
INVENTOR
A. W. DASCHKE
BY
P. C. Smith
ATTORNEY Patented Jan. 3, 1950

2,493,060

UNITED STATES PATENT OFFICE 2,493,060

ELECTRICAL CONTROL DEVICE

Arthur W. Daschke, Huntington, N. Y., assignor to Bell Telephone Laboratories, Incorporated, New York, N. Y., a corporation of New York Application December 31, 1946, Serial No. 719,344

1 Claim. (Cl. 200—56)

This invention relates to electromagnetic devices and more particularly to a relay of the voltmeter type.

Heretofore relays of the voltmeter type have been proposed in which the pointer of the instrument is provided with a contact member of magnetic material which is moved by the energization of the instrument coil into proximity to a fixed contact member of permanent magnet material so that the pointer contact is attracted into electrical engagement with the fixed contact and held in firm contact by magnetic attraction. The work circuit controlled by the instrument is thus established from the pointer through the contact carried thereby to the fixed contact.

In this type of instrument, since the pointer must carry a contact of magnetic material sufficiently large to be firmly attracted by the permanent magnet fixed contact, the moment of inertia of the indicating pointer is increased and, since the work circuit is established through the pointer, an additional hair-spring is therefore necessary to make the electrical connection with the pointer thereby further reducing the sensitivity of the instrument.

It is the object of the present invention to provide an instrument of this character which is rendered more sensitive and accurate.

This object is attained by providing an auxiliary member freely movable on jewel bearings against the restraint of a hair-spring when engaged by the end of the indicating pointer of the instrument. This auxiliary member is provided near its free end with a contact member of magnetic material or a permanent magnet contact which when moved into proximity with a relatively fixed permanent magnet or magnetic material contact member is attracted thereto to establish a work circuit which extends through the auxiliary member and the fixed contact member. The fixed contact member may be moved by a resetting knob to break the magnetic circuit between it and the auxiliary member and thus open the work circuit.

This construction removes the contact from the instrument pointer and, by eliminating the hair-spring by which the work circuit has heretofore been established through the pointer, decreases the moment of inertia of the indicating pointer and thereby renders the instrument more sensitive. Furthermore, by establishing the work circuit through the auxiliary member rather than through the instrument pointer heavier currents and higher voltage may be used in the work circuit. And since the magnet element of the contact pair is carried by the auxiliary member rather than by the instrument pointer it may be made larger to thereby increase the area of magnetic material attractable to the fixed permanent magnet contact and to thus provide a more positive electrical contact.

These and other advantages of the invention will be apparent from the following description taken in conjunction with the accompanying drawing in which:

Fig. 1 is a partial cross-sectional view of an instrument embodying the present invention taken along a section line just back of the glass enclosure plate of the instrument;

Fig. 2 is a sectional view taken along line 1—1 of Fig. 1; and

Fig. 3 is a fragmentary sectional view taken along line 2—2 of Fig. 2.

Referring in more detail to the drawing, the relay is provided with a casing molded from suitable insulating material and comprising a base member 1, a cylindrical wall member 2 and an enclosing member 3 of glass or other suitable transparent material. The member 3 may be held in place adjacent the shoulder 4 of the front rim of the wall member 2 by a flanged retaining ring, such as 5, secured to the wall by suitable screws 6.

The magnetic unit of the relay is attached to a plate 7 by screws 8, the plate in turn being secured to the base member 1 of the casing. The unit is provided with a field comprising two pole-pieces 9 and 10 of magnet iron and having arcuate pole faces 12 and 13. The pole-pieces are joined together by two arcuate permanent magnets 14 and 15 having their ends welded to the pole-pieces. Positioned between the pole-pieces 12 and 13 concentrically with their arcuate pole faces is a tubular cylindrical iron core 16. This core is supported at its ends by bridges 17 and 18 the ends of which have holes through which the bolts 19 and 20 extend.

Interposed in the air-gap between the outer surface of the core 16 and the pole faces 12 and 13 of the pole-pieces 9 and 10 is a coil 21. The coil is supported by a light channel frame of substantially rectangular shape and is so positioned and rotatably mounted in the air-gap that it may move freely. Secured to the ends of the coil 21 by a suitable adhesive are a pair of plates 22 and 23 each having an axially extending stud which terminates in a reduced portion. The reduced portions are mounted in the jewel bearings supported in the ends of the screws 24 and 25. The stud of the plate 22 carries a pointer 26 suitably insulated from the stud and a washer 27 having an outwardly projecting arm. A similar washer 28 having an outwardly extending arm is supported on the stud of plate 23. One terminal of the coil 21 is electrically connected to the projecting arm of washer 27 and the other end of the coil is electrically connected to the projecting arm of washer 28.

Spiral hair-springs 29 and 30 have their inner ends connected to the projecting arms of washers 27 and 28, respectively, and have their outer ends connected to the projecting arms of collars 31 and 32, respectively. These collars are supported on the adjusting screws 24 and 25 and are forced into frictional engagement with the bridge members 33 and 34, which are supported on the bolts 19 and 20, by the nuts 35 and 36 threaded upon the screws 24 and 25 and interposed castellated spring washers 37 and 38. The nuts 35 and 36 thus serve the double function of locking the screws 24 and 25 and of frictionally positioning the arms of collars 31 and 32. The purpose of the collars is to adjust the pointer 26 to its zero position at the right end of the scale as viewed in Fig. 1 when no current is passing through the coil 21 and also to serve as terminals for the coil. The collar 32 is preferably used for adjusting the relay prior to its assembly in the casing since it is not readily accessible when the unit is mounted in the casing.

The collar 31 is assembled on the screw 24 adjacent to a lever 39 which functions therewith as a friction clutch. The lever 39 may be adjusted to accurately set the pointer 26 on zero to compensate for small deviations occurring after the assembly of the unit in the casing. To enable this adjustment the outer end of lever 39 is engaged in a depression 40 in the block 41 which is mounted on the inside of the front plate 3 on the hub of knob 42 extending through a hole in the plate 3. After assembly the two members 41 and 42 are cemented together. The block 41 is channeled out at 43 to provide clearance for the lock nut 35 and screw 24 and the knob 42 is provided with a saw kerf 44 by which it may be turned by a screw-driver and in turn cause a rotation of the collar 39. It is to be noted that the knob 42 is axially aligned with the screw 24.

Secured to the plate 7 by screws 45 is a brass plate 46. This plate is positioned between the outer faces of the pole-pieces 9 and 10 and the pointer 26 by tubular spacers 47 which surround the screws 45. Plate 46 has etched or otherwise applied thereto a dial scale 48 positioned concentrically with the axis of the pointer 26. For cooperation with the scale the pointer has a portion thereof near its outer end reduced in thickness as indicated at 49.

Secured to the upper portion of the plate 46 by a bolt 50 is a U-shaped bracket 51. Mounted in a hole in one arm of this bracket is a jewel 52 and axially aligned therewith and supported in the end of an adjusting screw 53 threaded into the other arm of the bracket is a second jewel 54. Mounted on a spindle 55 having its ends trunnioned in the jewels 52 and 54 is a member 56 having a depending arm 57. Surrounding the member 56 is a helical hair-spring 58 the inner end of which is attached to such member and the outer end of which is secured to the arm of an adjusting lever 59. The lever 59 is journaled on the hub of the lock nut 60 which is threaded upon the adjusting screw 53 and is held in frictional engagement with the bracket 51 by the castellated washer 61 supported on the hub of nut 60 between the nut and the lever 59. The nut 60 thus serves to lock the screw 53 in its adjusted position and to frictionally hold the lever 59 in the position to which it is moved to adjust the tension of the hair-spring 58. The spring 58 is so tensioned as to normally hold the arm 57 against the back-stop 62. Back-stop 62 is of insulation material and is secured to the plate 46. The arm 57 may be swung in a clockwise direction by the engagement of the outturned end 63 of the pointer 26 therewith.

The arm 57 has a contact element 64 of magnetic material secured thereto near its lower end which when moved into proximity with the permanent magnet contact 65 by the movement of arm 57 by the engagement of the end 63 of the pointer 26 therewith, is attracted to such magnet and makes electrical contact therewith. The permanent magnet contact 65 is secured to the end of a contact lever 66 which is clamped to a hub member 67 journaled on a stub shaft 68 secured to the mounting bracket 69. The mounting bracket is in turn secured to the plate 46 by the bolt 70. The lever 66 is normally held in the position disclosed in Fig. 1 against the stop pin 71 secured to the plate 46, by a coil spring 72, one end of which is attached to the anchor pin 73 secured to the plate 46 and which spring is then wrapped one or more turns around the hub member 67 with its other end secured to the grommet 64 inserted in the lever 66.

Electrical connection is made to the lever 66 and therethrough to the contact 65 by an insulated conductor 75 one end of which is soldered to the lever 66 and the other end of which extends through the grommet 76 and attached to a terminal lug not disclosed but insulatedly secured to the plate 46 by the screw 77.

To enable the movement of the lever 66 in a counterclockwise direction against the tension of the spring 72 to break the magnetic engagement of the contacts 64 and 65 when it is desired to reset the relay and open the work circuit, a resetting knob 78, disclosed in Fig. 3, is journaled in a bushing 79 inserted into the cover plate 3. The shaft 80 of knob 78 is hollow and is aligned with the hub member 67 on which the lever 66 is clamped. The end of the shaft 80 is slotted so that when it is pushed in over the end of the hub member 67 it engages pins 81 in its slot so that when the knob is thereafter turned the lever 66 is also turned.

In the operation of the relay when the pointer 26 is moved by the coil 21 to the extreme left or maximum reading end of the scale 48 into the dotted line position in which it engages the insulated stop pin 82, the end 63 of the pointer engages the depending arm 57 and moves the contact 64 carried thereby into the field of permanent magnet contact 65. Thereupon the magnet 65 attracts the contact 64 and moves it into the dotted line position shown in Fig. 1. The work circuit is thereupon established from the terminal connected to conductor 75, through conductor 75 is lever 66 and contact 65 carried thereby, contact 64, arm 57, through spring 58, lever 59 and bracket 51 to the plate 46 to which the other terminal of the work circuit may be connected. The pointer 26 is free to move towards its zero reading position in response to the coil 21, but the work circuit remains closed until disrupted by the operation of reset knob 78.

When the reset knob 78 is rotated in a counterclockwise direction and rotates the lever 66 as previously described, the contact 65 carried by the lever is moved toward the left as viewed in Fig. 1, moving the contact 64 and the arm 57 with it until the arm 57 engages the front stop pin 83. Thereafter upon continued movement of contact 65 the contact 64 being now unable to follow the movement of contact 65, the contact 65 is broken away from contact 64 to open the work circuit. The arm 57 is then moved by spring 58 back into its normal position until the arm engages stop pin 62. When the knob 78 is released, the spring 72 functions to return the lever 66 into its normal position against stop pin 71.

While the instrument has been disclosed with the contact mechanism operable when the pointer 26 is moved to its maximum reading position, it will be obvious that such mechanism could be located on the right side of the dial plate 46 to be operable in the minimum reading position of the pointer 26 or two sets of contact mechanisms could be provided, one to be operable as disclosed in the maximum reading position of the pointer 26 and the other in the minimum reading position of the pointer.

What is claimed is:

A control device comprising a measuring instrument having a first contact, a movable contact, an arm to which said latter contact is secured, a spindle on which said arm is supported, jewel bearings in which said spindle is journaled, a back-stop for said arm, a hair-spring for normally holding said arm against said back-stop, a moving system having a member engageable with said arm for moving it against the tension of said spring towards said first contact, one of said contacts being of magnetic material and the other being a magnetized body operative to attract said magnetic material contact when said member moves said movable contact into a predetermined position with respect to said first contact, a pivoted lever on which said first contact is mounted, a resetting knob operative into clutching engagement with said lever whereby said lever may be turned by said knob to move said first contact to break its magnetic engagement with said movable contact, and a spring for restoring said first contact to its normal position.

ARTHUR W. DASCHKE.

REFERENCES CITED

The following references are of record in the file of this patent:

UNITED STATES PATENTS

| Number | Name | Date |
|---|---|---|
| 392,386 | Weston | Nov. 6, 1888 |
| 724,724 | Mitchell | Apr. 7, 1903 |
| 2,014,385 | Lamb | Sept. 17, 1935 |
| 2,014,388 | Lamb | Sept. 17, 1935 |